2,908,942
PROCESS OF MANUFACTURING PLASTIC FLOWERS AND LEAVES IN MULTICOLOR DESIGN

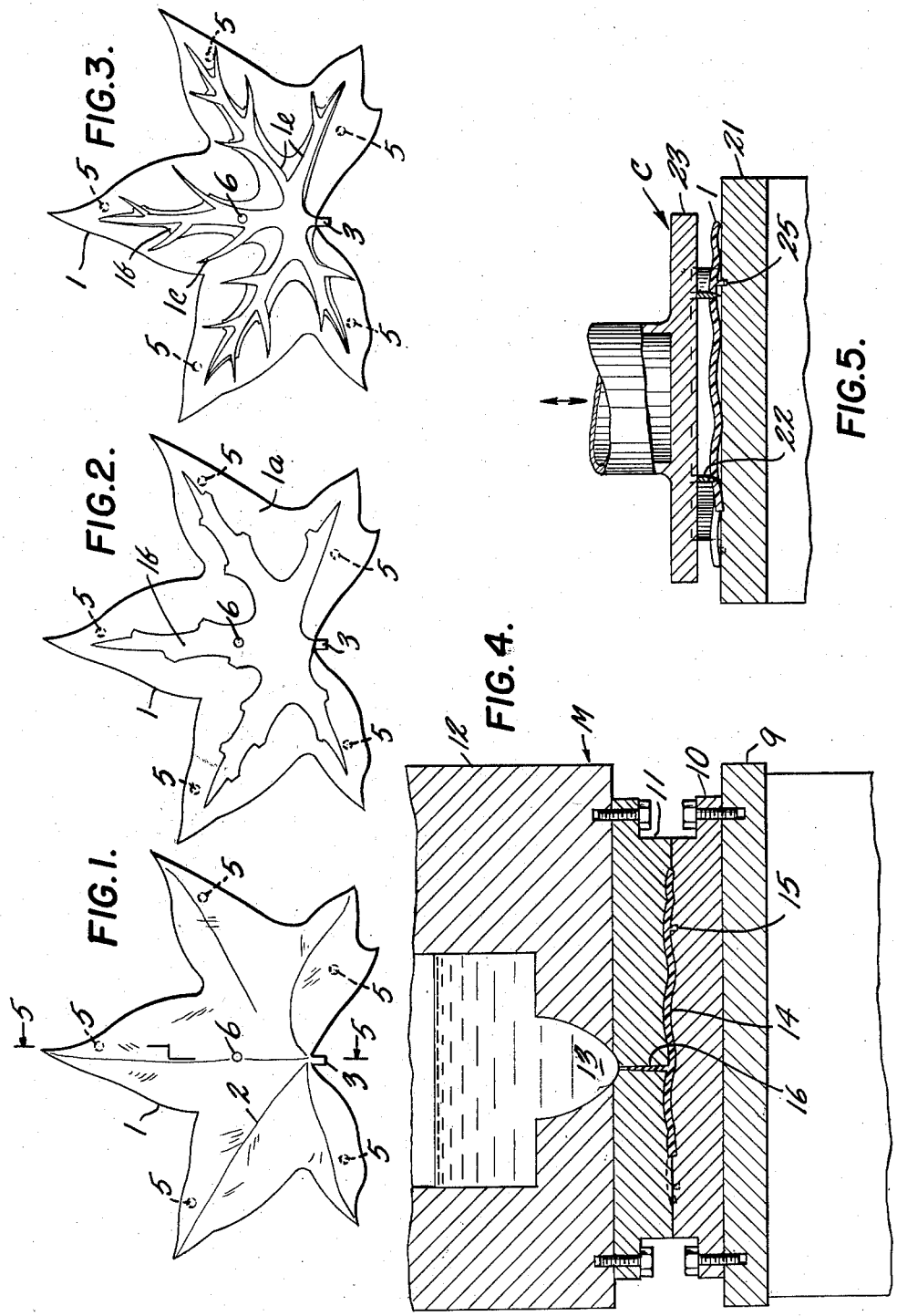

Lino Bosco, Turin, Italy

Application August 6, 1957, Serial No. 676,565

Claims priority, application Italy May 7, 1957

4 Claims. (Cl. 18—59)

The present invention relates to a process for manufacturing multicolored plastic flowers and leaves. It is an object of the present invention to provide an approved method for making artificial flowers and leaves of plastic material in a wide variety of multicolor designs.

The process in accordance with the invention comprises first forming or shaping a leaf, petal or flower in a mold, removing selected portions of the leaf and then injecting plastic of a different color, texture or appearance into the space left by the removed portion while the leaf or flower is in the same mold so as to retain its original shape. The steps of removing portions of the leaf or flower and injecting plastic of a different appearance to replace the removed portions may be repeated any desired number of times in order to obtain leaves with portions of selected shape formed of several different colors.

The invention will now be described in detail with reference to the enclosed drawings which illustrate schematically a practical method of carrying out the invention, it being understood that the invention is in no way limited to the particular embodiment shown and described.

In the drawings:

Figs. 1, 2 and 3 show by way of example three successive stages in the manufacture of a leaf in accordance with the invention.

Fig. 4 is a sectional view illustrating schematically a mold for use in the process.

Fig. 5 is a sectional view illustrating schematically a cutter for cutting out selected portions of the leaf in carrying out the process.

The process in accordance with the invention comprises shaping or forming a complete leaf, petal or flower by the injection molding of plastic material. Polyethylene, polystyrene or other suitable plastics may be used. By way of example in Fig. 1 there is shown a leaf 1 having veins 2 and a stem 3. The leaf is also provided—preferably near its periphery—with a plurality of registration points 5 in the form of small indentations, holes or protuberances. The leaf is also shown as having an injection spot 6 which is preferably disposed in the central part of the leaf.

An injection mold M for making the leaf 1 shown in Fig. 1 is illustrated schematically in Fig. 4 and comprises a base 9, mold members or dies 10 and 11 and an injection head 12 having an injection nozzle 13. The mold members 10 and 11 are engraved or otherwise shaped to provide a mold cavity 14 which is shaped to provide the desired configuration of the leaf including the veins and stem. The lower mold 10 is shown provided with small depressions 15 to provide protuberances serving as the reference points 5 while the mold 11 is provided with an injection hole 16 which registers with the injection nozzle 13 and is located in the central portion of the mold cavity as indicated by the injection spot 6 in Fig. 1.

After the leaf has been molded, a selected central portion 1b of the leaf is cut or otherwise removed leaving a surrounding portion 1a. It will be seen that the removed portion 1b includes the injection spot 6 but does not include the stem 3 or the reference points 5. A cutter C suitable for removing the portion 1b is illustrated schematically in Fig. 5 and includes a platen 21 and a cutting blade or edge 22 carried by a head 23 which is reciprocable toward and away from the platen. The cutting edge 22 has a configuration corresponding to the size and shape of the area that is to be cut out. The platen 21 is preferably provided with small depression 25 into which the reference points 5 of the leaf fit to position the leaf 1 accurately on the platen. After the leaf has been positioned with the head 23 in raised position, the head is pressed down on the platen so that the cutting edge 22 severs the portion 1b that is to be removed.

The leaf 1 is then positioned in the mold M in its original position. Registration of the stem 3 and the reference points 5 with corresponding portions of the mold facilitates accurate positioning of the leaf. Plastic of the different texture or color is then injected in the space left by the removed portion 1b. The plastic is injected at a relatively high temperature (for example 120 to 200° C.) in such manner as to cause local melting of the edges of the parts previously formed which, by reason of their contact with the hot walls of the mold, have a temperature of about 50° C. The local melting of the edges of the portions previously formed assures a perfect union with the newly injected material and also brings about a slight mixture of the material to provide a shading of the colors. In order further to assure a strong union between the two parts, the shearing line defining the cut out portion 1b may have a serrated or sawtooth profile.

The process described above can be continued through any desired number of steps by cutting out selected portions and injecting plastic of a different color or mixture into the cut out portion. For example in Fig. 3 there is illustrated cutting out an area 1c corresponding in shape to that of the main ribs or veins of the leaf. It will be noted that portions of the area 1c extend into the original area 1a as well as in the area 1b. After the area 1c has been cut out, the leaf is once again placed in the same mold that was used in the previous injections. The stem 3 and reference points 5 assist in accurately positioning the leaf in the mold. A third injection is then made of selected plastic material in such a manner as to fill in the cut out portion corresponding to the ribs of the leaf.

Successive removal of selected areas and injections to replace the material removed may be repeated as desired so as to obtain leaves or flowers having portions formed of various colors in accordance with pre-determined designs. The final shape of the leaf or flower is identical to that of the leaf obtained by the first injection molding as the same mold is employed for the successive injections.

It will be understood that within the scope of the invention the particulars of construction and the method of realization may be varied widely and that the invention is in no way limited to the particular example herein shown and particularly described. It will further be understood that for convenience of terminology, the term "leaf" is herein used in a generic sense to include leaves, petals and complete flowers.

What I claim and desire to secure by Letters Patent is:

1. Process for manufacturing leaves and the like from plastic material which comprises forming a complete leaf by injecting in the cavity of a mould a thermoplastic material at a determined zone of said cavity, thereby determining the position of an injection spot in the leaf to be formed, setting of said material injected into said cavity of the mould, removing selected portion of the leaf so formed, said selected portion of the leaf including said injection spot, positioning the leaf so treated in its original position in the same mould and injecting a thermoplastic material of different appearance at the same zone of said cavity to replace the cut out portions while retaining the original shape of the leaf and setting of said injected material of different appearance.

2. Process for manufacturing leaves and the like from plastic material which comprises providing a mould having a closed cavity defining the general shape of the leaf, injecting in a predetermined zone of the cavity a thermoplastic material in a softened condition to completely fill said cavity with said material, setting the latter in said cavity, thereby obtaining a unitary leaf having an injection spot localized thereon, removing a selected portion of the leaf so formed, said selected portion of the leaf including said injection spot, positioning the leaf so treated in its original position in the same mould and injecting a thermoplastic material of different appearance at the same zone of said cavity to replace the cut out portions while retaining the original shape of the leaf and setting of said injected material of different appearance.

3. Process as set forth in claim 2, comprising further the steps of removing the selected portion of said thermoplastic material of different appearance, said selected portion including said injection spot, positioning the leaf so treated in its original position in the same mould and injecting a thermoplastic material of further different appearance at the same zone of said cavity to replace the cut out portions while retaining the original shape of the leaf and setting of said last mentioned material.

4. Process as set forth in claim 2, comprising further the steps of removing the selected portion of said thermoplastic material from which said unitary leaf has been made and of said thermoplastic material of different appearance, said selected portion including said injection spot, positioning the leaf so treated in its original position in the same mould and injecting a thermoplastic material of further different appearance at the same zone of said cavity to replace the cut out portions while retaining the original shape of the leaf and setting of said last mentioned material.

References Cited in the file of this patent

UNITED STATES PATENTS

| | | |
|---|---|---|
| 2,428,977 | Mares | Oct. 14, 1947 |
| 2,485,323 | Schwartz | Oct. 18, 1949 |